United States Patent Office 3,425,846
Patented Feb. 4, 1969

3,425,846
METHOD OF PREPARING AN EDIBLE TUBULAR COLLAGEN CASING
Robert D. Talty, Danville, Ill., assignor to Tee-Pak, Inc., Chicago, Ill., a corporation of Illinois
Filed July 13, 1965, Ser. No. 471,645
U.S. Cl. 99—176
Int. Cl. A22c 13/00
2 Claims

ABSTRACT OF THE DISCLOSURE

Edible sausage casings are prepared from fresh or frozen or salt-cured animal hides treated with a lime-containing solution for a period of 3–12 hours to at least partially dehair the hide, then washing the hide, removing the epidermal layer and remaining hair, grinding the hide at a temperature less than 20° C. to produce a collagen containing slurry, acidifying the slurry to swell the collagen, said washing, grinding and acidification being carried out in less than 12 hours, and then extruding the slurry in tubular form, tanning the collagen tube, and washing, plasticizing, and drying the tube to produce an edible casing.

---

Figure 1:
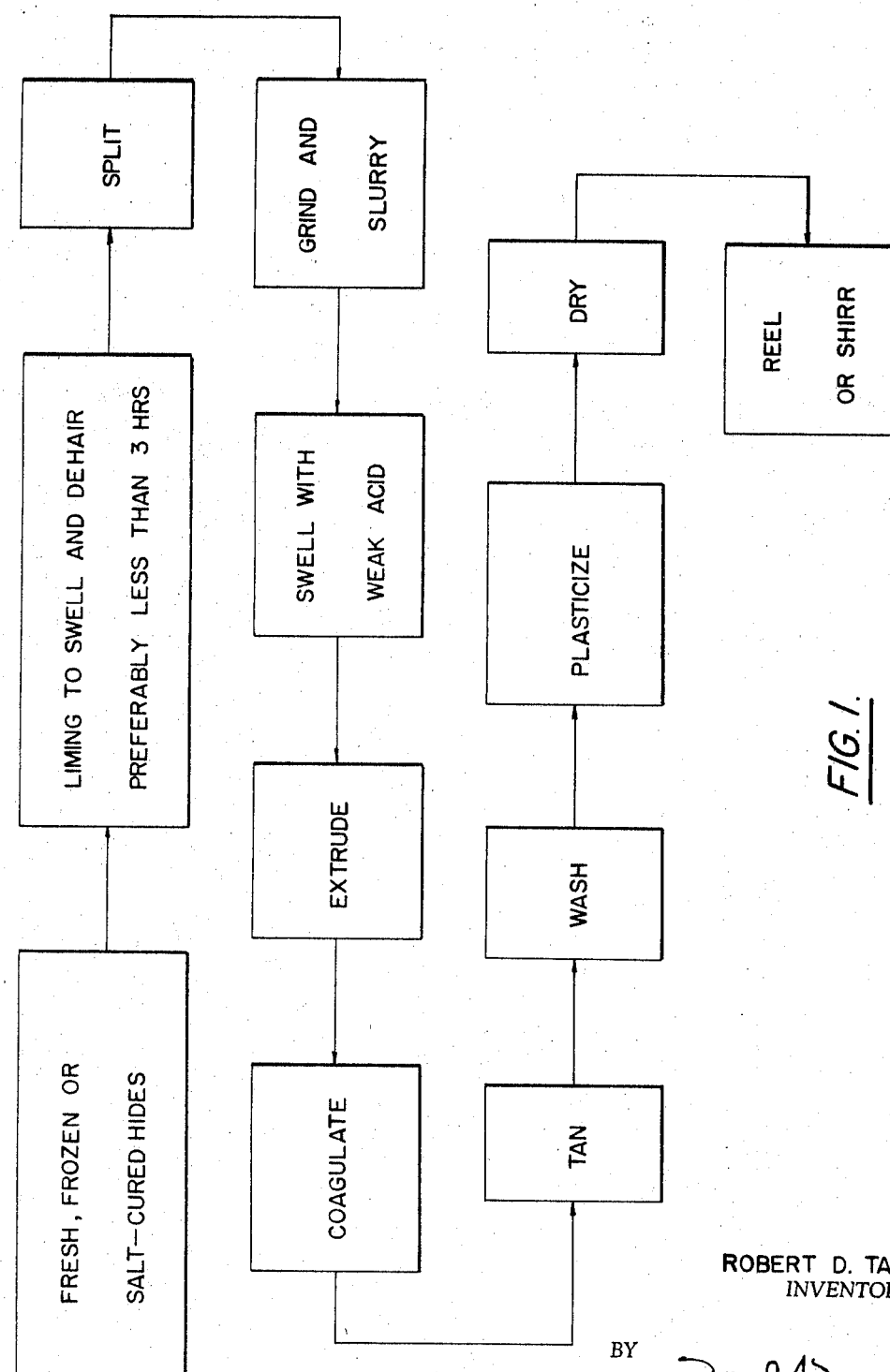

This invention relates to new and useful improvements in artificial sausage casings and more particularly to the production of artificial sausage casings from limed animal hide collagen without an intermediate deliming step.

Natural casings are prepared from the intestines of various edible animals, primarily cattle and sheep. The intestines are removed from the slaughtered animal and are thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casing eaten with the cooked sausage. In the preparation of certain smoked or pre-cooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, primarily of regenerated cellulose, which are used in the preparation of the major portion of sausages which are made and sold today. Cellulose casings are used in the preparation of large sausages such as bolognas, salamis, and the like, and are removed from the sausage by the consumer at the time of final preparation for eating. Regenerated cellulose casings are also used in the preparation of frankfurter sausages wherein the casing is stuffed with sausage emulsion, linked, smoked, and cooked, and the casing removed from the finished sausage. Regenerated cellulose casings have not proved satisfactory for the processing of pork sausages inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hides to break the collagen into a fibrous structure and extrude the collagen fibers in the form of a doughy mass to produce tubular casings. The casings which have been prepared in this manner have been hardened by treatment with formaldehyde and have been used as removable casings for processing various sausages. These casings have not been edible even though collagen itself is edible.

More recently, edible sausage casings of collagen have been prepared and sold in commercial quantities. In the manufacture of edible collagen casings, considerable emphasis has been placed upon the necessity for using collagen source materials which have not been subjected to a liming treatment. In fact, a number of recent patents describing the production of collagen casing have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

In the co-pending patent application of Robert D. Talty and Mauj A. Cohly, Ser. No. 442,885, filed Mar. 26, 1965, a process is described in which edible collagen casings are prepared from limed hide collagen. In that process, animal collagen is obtained from limed hides which are subsequently subjected to an acid deliming process.

In the preparation of edible collagen casings, hide collagen is converted into a finely divided fibrillar form and extruded in the form of a dilute collagen slurry. The extruded collagen is passed into a sodium sulfate and or ammonium sulfate coagulating bath which dehydrates the collagen slurry and forms a coherent collagen film. At this stage in the processing, however, the salt coagulated collagen film can be handled but will revert to a thin slurry upon contact with water. It is therefore necessary to harden or tan the extruded collagen film to permit further processing of the film and to provide the film with sufficient strength for use as a sausage casing. A satisfactory tanning process must utilize a tanning agent which is very rapid in tanning action and completely nontoxic in the form in which it is present in the finished casing and must produce a casing of sufficient strength to be stuffed with sausage meat, linked, packaged, and finally cooked.

It is therefore one object of this invention to provide a new and improved process for the preparation of edible collagen casings from limed hides without deliming the collagen.

Another object of this invention is to provide a new and improved edible collagen casing prepared from limed hides.

A feature of this invention is the provision of an improved process for preparing edible collagen casings from limed hides by rapid processing of the collagen without deliming the collagen.

Another feature of this invention is the provision of a new and improved edible collagen casing prepared from limed hides without deliming the collagen.

Other objects and features of this invention will become apparent from time to time throughout the specification and claims as hereinafter related.

Collagen tissues which are suitable for preparation of extruded collagen casings are obtainable from hide and tendon, although hide collagen is preferred for casing manufacture. Collagen is formed of a large number of fibers which in turn consist of a much greater number of fibrils of submicroscopic size. Collagen fibrils have a diameter of the order of 10 to 50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar films.

This invention is based upon the discovery that satisfactory edible collagen casings can be prepared using limed animal hides as the source of collagen. In fact, superior edible casings can be prepared in this manner. The animal hide is treated to remove the blood quickly and is frozen or salt-cured or immediately treated with a lime-containing solution to at least partially dehair the hide. The liming step (of the fresh, frozen, or salt-cured hide) must be carried out in less than 48 hours and preferably less than 12 hours (e.g., 3 hours or less). The hide is then washed, dehaired, ground at a temperature less than 20° C., and swollen with acid at a pH of 2.5–3.5. These steps must be carried out rapidly, viz in less than 48 hours, preferably less than 12 hours. When the hide is limed, washed, ground, and swollen quickly, as above described, a strong edible casing can be prepared without deliming the collagen.

The swollen collagen slurry which is produced above is extruded through an annular die into a coagulating bath to form a salt-coagulated tube. The tube is then tanned, using a nontoxic rapid tanning agent, washed, plasticized, dried, shirred and packaged.

Figure 2:
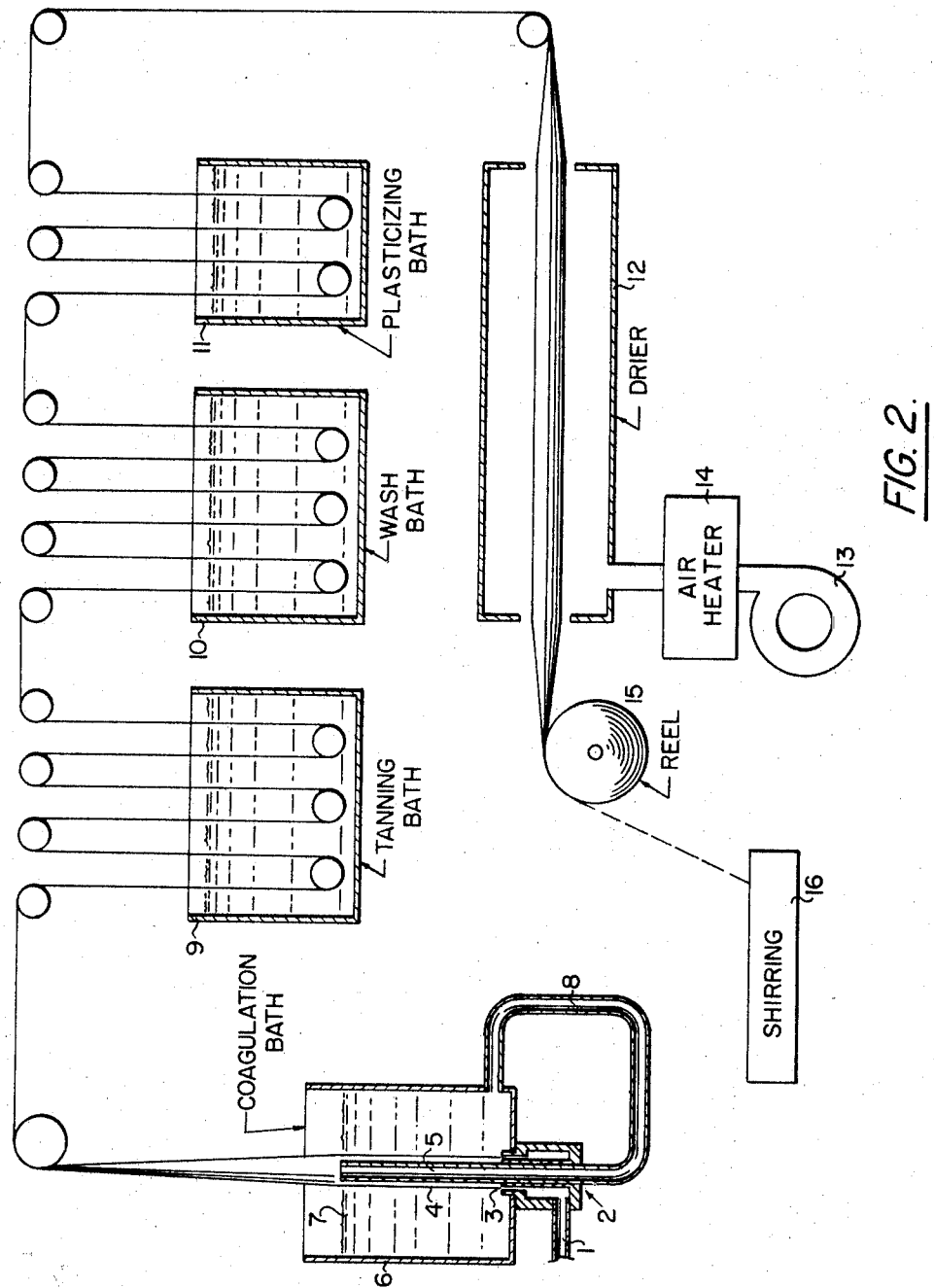
Figure 3:
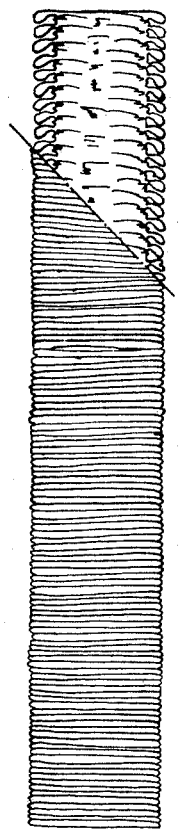
Figure 4:
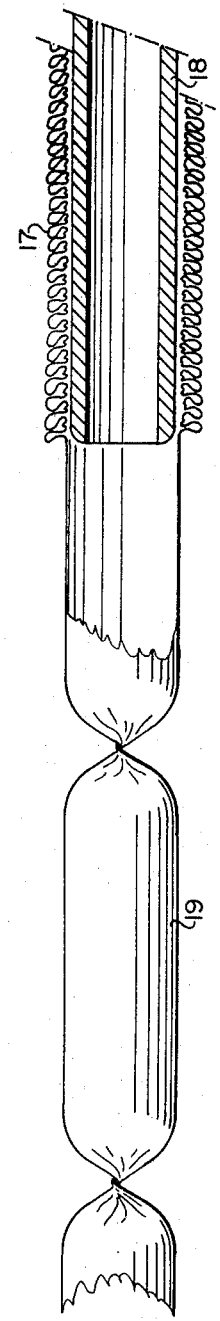

The process for preparation of casings in accordance with this invention will be understood more fully by reference to the following description and the accompanying drawings, in which:

FIG. 1 is a flow diagram illustrating schematically the more important steps in the extrusion, tanning, and processing of edible collagen casings, FIG. 2 is a schematic view of the apparatus used in the process shown in FIG. 1, FIG. 3 is an extruded edible collagen casing prepared in accordance with this invention as processed in a shirred form, and FIG. 4 is a schematic view showing the filling of the casing with sausage meat on an extrusion horn or nozzle and the preparation of sausage links therefrom.

In a preferred form of the process, animal hides are cut into suitable pieces (hide trimmings may also be used) and are treated with a suitable lime solution for removal of hair. The hide may also be limed before cutting into small pieces. The lime solution is preferably a solution containing excess solid lime (Ca(OH$_2$), sodium sulfhydrate (NaSH), and dimethylamine sulfate

$$((CH_3)_2NH_2)_2SO_4)$$

After treatment in such a solution for a period of less than 2 days (3 to 12 hours or less is preferred), the hides are removed and washed. After washing, the hides are split or otherwise mechanically abraded to remove the epidermal layer and any remaining hair.

The hides which are thus prepared are ground into particles of very small size to produce an aqueous slurry having a collagen content in the range from about 2–6%, preferably about 3.5–5%. The collagen is maintained at a temperature less than about 20° C. (preferably less than 10° C.) during the grinding by repeated addition of ice to the mixture. The collagen slurry which is thus prepared is treated with a dilute solution of weak acid to swell and burst the collagen fibers as previously described. The washing, dehairing, grinding, and acid-swelling of the collagen are carried out in less than 48 hours, preferably less than 12 hours.

The swollen collagen slurry is then extruded through an annular die to produce a thin-walled tubular product suitable for use as sausage casings after tanning and further processing. In order to obtain maximum strength in the product casing, the collagen slurry is preferably extruded through a die having rotating inner and/or outer parts which is well known in the prior art in the preparation of collagen casings, vide Becker U.S. Patent 2,046,541.

The collagen slurry is extruded through the die into a coagulating bath consisting of a concentrated solution of sodium sulfate or ammonium sulfate. The thin-walled collagen tube which is formed in the coagulating bath is then passed into a tanning bath, viz a solution of a soluble ferric salt, or an aluminum salt, or a non-toxic dialdehyde, such as glutaraldehyde, and subsequently washed and plasticized. The casing which is thus prepared is inflated with air or other gas and passed through a dryer. From the dryer, the casing is either rolled up on reels or is passed on to a shirring machine where it is shirred into short strands as illustrated in FIG. 3 of the drawings. It is preferred to shirr the casing directly from the dryer since it is easier to maintain the casing in an inflated state. The casing may be shirred on shirring machines of the type shown in Blizzard et al., U.S. Patent 2,722,714; 2,722,715; 2,723,201; or Ives U.S. Patent 3,122,517.

In FIG. 2 of the drawings, the steps from extrusion through reeling or shirring are illustrated schematically in slightly more detail. The collagen slurry is introduced through inlet conduit 1 into die 2 having an annular die outlet 3 through which casing 4 is extruded. The die 2 has an inner tube 5 which extends upwardly within the extruded casing to remove coagulating bath from within the extruded casing. The die 2 is located at the bottom of container 6 which contains coagulating bath 7. Coagulating bath 7 is circulated through conduit 8 from tube 5 for removal of the coagulating bath from inside the extruded casing. Casing 4 which is coagulated in the bath 7 passes over a series of rollers and is directed through a tanning bath 9.

Tanning bath 9 consists of an aqueous solution of any suitable nontoxic tanning agent, e.g., alum, glutaraldehyde, ferric salts, such as ferric ammonium sulfate, ferric sulfate, ferric nitrate, or any of the ferric halides.

From the tanning bath 9, the casing passes through a wash bath 10 where unreacted tanning reagent is washed out of the casing. The casing is then passed through plasticizing bath 11 which introduces a small amount of a plasticizer such as glycerine into the casing. From the plasticizing bath 11, the casing passes through dryer 12 where it is inflated and dried with the aid of air circulated by fan or blower 13 through air heater 14. After leaving dryer 12, the casing may be rolled up on reel 15, but is preferably passed directly to a shirring machine shown diagrammatically at 16. If the casing is first rolled up on reels it may be subsequently shirred if desired. The shirring machine which is used for preparation of shirred strands of casing may be of any suitable design such as the types commonly used in the shirring of regenerated cellulose sausage casings as noted above.

After the casing is shirred into individual short strands, it is packaged and cured by heating at 60–80° C. in an atmosphere of 20–50% relative humidity for several hours prior to shipment to the meat packer. In FIG. 4 the stuffing of the casing is illustrated. A strand of edible iron-tanned collagen casing 17 is placed on a tubular stuffing horn 18 which is connected to a pressurized source of sausage emulsion (not shown). The sausage emulsion is passed through the stuffing horn 18 into the end of casing 17 and the casing is filled with sausage meat and twisted at suitable intervals to provide sausage links 19. The links may be severed from each other and packaged in a suitable overwrap following conventional meat packaging techniques. When the sausage is cooked by the consumer, the casing is found to be quite strong and shrinks with the meat during cooking. The casing may be prestuck, if desired, to permit more rapid release of fat during the cooking of the sausages. Casing which is prepared in this manner has been found to have a shrinkage temperature which is equal to or greater than native collagen and thus does not shrink excessively during cooking.

The following nonlimiting examples are illustrative of the application of this invention in the preparation of a satisfactory edible collagen casing:

Example 1

In this example, the rapid preparation of edible collagen casings from limed animal hides with ferric salt tanning is illustrated. Fresh heifer hides are limed for a period of 3 hours at 10° C. in a liming solution equal to 300% of the weight of the hide being treated. The solution contains 5% lime, 1% sodium sulfhydrate, and 3% dimethylamine sulfate based on the weight of hide treated. At the end of the 3-hour treatment, the hair is substantially loosened and partially removed.

The hide is washed to remove excess liming solution and then is defleshed and split (or mechanically abraded) to remove the remaining hair and epidermal layer. Next, the hide splits are cut into small square or rectangular sections, e.g., ¼–4 inches on a side in preparation for grinding.

The small pieces of treated hide are converted to a fine pulp by successive passes through a meat grinder. In this grinding operation, sufficient ice is mixed with the hide splits to maintain the temperature below above 20° C. (preferably below 10° C.). Successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient dilute lactic acid (other dilute or weak acids may be used) to produce a pH of 2.5–3.7. After thorough mixing, the pulp and acid are stored overnight at a temperature of 3° C. to swell. At the end of this time, the collagen has swollen and taken up all of the water in the slurry. The swollen collagen is mixed with sufficient additional water and acid to maintain a pH of 2.5–3.7, producing a thin homogeneous paste consisting of approximately 4% collagen and 1.2% lactic acid. This paste is further homogenized, filtered to remove any solid contaminants, and deaerated.

The process, from the washing of the limed hide through the acid-swelling of the comminuted collagen, is carried out in a period of about 6 to 12 hours (and in no event longer than 48 hours).

The acid-swollen slurry is then pumped under pressure through the extrusion die as previously described into a coagulating bath consisting of 42% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

After the film is coagulated in the ammonium sulfate solution, it is necessary to tan the film to give the film sufficient strength for further processing and for stuffing with sausage meat. If the film were taken from the ammonium sulfate coagulating bath and were dried, a film would be produced which has moderate strength in the dry state but which would revert to a paste upon contact with water. It is therefore necessary for the casing to be tanned or hardened to provide the wet and dry strength in the finished product required in an edible casing.

From the coagulation bath, the casing next passes into a tanning bath which comprises a solution of 10% ferric ammonium sulfate and 20% ammonium sulfate. In this bath, the casing is hardened or tanned. The casing passes over a series of rollers in the ferric ammonium sulfate solution to provide multiple passes giving a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerine in water. From the plasticizing bath the casing passes through a dryer where it is inflated with compressed air and dried by circulation of heated air over the surface of the inflated casing. The casing was dried by air maintained at a temperature of 70° C. circulated at a rate of 200 feet per minute.

After drying, the casing is preferably shirred (since this permits introduction of air to maintain the casing inflated in the dryer) or may be first reeled and then shirred prior to packaging.

Casing which is prepared in this manner is superior both in longitudinal and transverse tensile strengths to casing prepared from unlimed collagen. The rapid processing of the hide and collagen stock and the tanning of the casing is effective to produce a strong coherent film of collagen fibrils having a high longitudinal and transverse strength, both dry and rewet. The casing has a shrink temperature substantially higher than native collagen and is generally satisfactory for encasing sausage products.

Casings made by the above described method are uniform in diameter and wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

The casing prepared as described above could be shirred without difficulty using a shirring machine of the type used for the shirring of regenerated cellulose casing. The shirred casing could be stuffed and linked without difficulty.

Example 2

In this example, another preparation of edible collagen casings from limed animal hides with ferric salt tanning is illustrated. Frozen steer hides are thawed and limed for a period of 6 hours at 10° C. in a liming solution equal to 400% of the weight of the hide being treated. The solution contains 5% lime, 1.5% sodium sulfhydrate, and 2% dimethylamine sulfate based on the weight of hide treated. At the end of the 6-hour treatment, the hair is substantially loosened and partially removed.

The hide is washed to remove excess liming solution and then is defleshed and split to remove the remaining hair and epidermal layer. Next, the limed and washed hide splits are cut into small square or rectangular sections, e.g., ¼–4 inches on a side in preparation for grinding.

The small pieces of treated hide are converted to a fine pulp by successive passes through a meat grinder. In this grinding operation, sufficient ice is mixed with the hide splits to maintain the temperature below about 10° C. Successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored for at least one hour at a temp. of 10° C. to swell. At the end of this time, the collagen has swollen and taken up all of the water in the slurry. The swollen collagen is mixed with additional water and acid to produce a thin homogeneous paste consisting of 4% collagen and 1.2% lactic acid (to maintain a pH of 2.5–3.7). This paste is further homogenized, filtered to remove any solid contaminants, and deaerated. The process, from the washing of the limed hide through the acid-swelling of the comminuted collagen, is carried out in a period of about 6 to 12 hours (and in no event longer than 48 hours).

The slurry is then pumped under pressure through the extrusion die as previously described into a coagulating bath consisting of 35% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

From the coagulation bath, the casing next passes into a tanning bath which comprises a solution of 3% glutaraldehyde having an initial pH of 5.0. The casing passes over a series of rollers in the ferric sulfate solution to provide multiple passes giving a residence time of about 3 minutes in the bath.

From the tanning bath, the casing then passes into a wash bath where it is maintained for a period of about 10 minutes by a multiple pass arrangement. After washing, the casing passes through a plasticizing bath consisting of 5% glycerine in water. From the placticizing bath the casing passes through a dryer where it is inflated with compressed air and dried by circulation of heated air over the surface of the inflated casing. The casing is dried by air maintained at a temperature of 65° C. circulated at a rate of 250 feet per minute.

After drying, the casing is preferably shirred (since this permits introduction of air to maintain the casing inflated in the dryer) or may be first reeled and then shirred prior to packaging.

The rapid processing of the hides and collagen stock and the tanning of the casing are effective to produce a strong coherent film of collagen fibrils having a high longitudinal and transverse strength, both dry and rewet. The casing has a shrinkage temperature substantially higher than native collagen.

Casings made by the above described method are uniform in diameter and wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

The casing prepared as described above could be shirred without difficulty using a shirring machine of the type used for the shirring of regenerated cellulose casing. The shirred casing could be stuffed and linked without difficulty.

*Example 3*

In this example, still another preparation of edible collagen casings from limed animal hides is illustrated. Salt-cured steer hides are thoroughly washed and then limed for a period of 3 hours at 10° C. in a liming solution equal to 500% of the weight of the hide being treated. The solution contained 5% lime, 1.25% sodium sulfhydrate, and 3% dimethylamine sulfate based on the weight of hide treated. At the end of the 3-hour treatment, the hair is substantially loosened and partially removed.

The hide is washed to remove excess liming solution and then defleshed and split to remove the remaining hair and epidermal layer. Next, the limed and washed hide splits are cut into small square or rectangular sections, e.g., ¼–4 inches on a side in preparation for grinding.

The small pieces of treated hide are converted to a fine pulp by successive passes through a meat grinder. In this grinding operation, sufficient ice is mixed with the hide splits to maintain the temperature below about 15° C. Successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored overnight at a temperature of 3° C. to swell. At the end of this time, the collagen has swollen and taken up all of the water in the slurry. The swollen collagen is mixed with additional water and acid to produce a thin homogeneous paste consisting of 4% collagen and 1.2% lactic acid (to maintain a pH of 2.5–3.7). This paste is further homogenized, filtered to remove any solid contaminants, and deaerated. The process, from the washing of the limed hide through the acid-swelling of the comminuted collagen, is carried out in a period of about 6 to 12 hours (and in no event longer than 48 hours).

The slurry is then pumped under pressure through the extrusion die as previously described into a coagulating bath consisting of 30% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

From the coagulation bath, the casing next passes into a conventional alum tanning bath. The casing passes over a series of rollers in the alum tanning solution to provide multiple passes giving a residence time of at least 1 minute in the bath.

From the tanning bath, the casing then passes into a wash bath where it is maintained for a period of about 10 minutes by a multiple pass arrangement. After washing, the casing passes through a plasticizing bath consisting of 5% glycerine in water. From the plasticizing bath the casing passes through a dryer where it is inflated with compressed air and dried by circulation of heated air over the surface of the inflated casing. The casing is dried by air maintained at a temperature of 70° C. circulated at a rate of 200 feet per minute.

After drying, the casing is preferably shirred (since this permits introduction of air to maintain the casing inflated in the dryer) or may be first reeled and then shirred prior to packaging.

The rapid processing of the hide and collagen stock and the tanning of the casing are effective to produce a strong coherent film of collagen fibrils having a high longitudinal and transverse strength, both dry and rewet. The casing has a shrinkage temperature substantially higher than native collagen.

Casings made by the above described method are uniform in diameter and wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

The casing prepared as described above could be shirred without difficulty using a shirring machine of the type used for the shirring of regenerated cellulose casing. The shirred casing could be stuffed and linked without difficulty.

While this invention has been described fully and completely with special emphasis upon several preferred embodiments it should be understood that within the scope of the appended claims the invention may be practiced otherwise than as specifically described herein.

What is claimed is:

1. A method of preparing an edible tubular collagen casing which consists of treating a fresh or frozen or salt-cured animal hide with a lime-containing solution for a period of about 3 to 12 hours, sufficient to at least partially dehair the hide, washing the hide to remove excess liming solution, removing the epidermal layer and remaining hair, grinding the hide at a temperature less than about 20° C. to produce a slurry of finely divided collagen in water, treating the slurry with acid at a pH of 2.5–3.7 to swell the collagen, said washing, gripping and acidification of the hide being carried out in less than 12 hours, extruding the slurry at a collagen content of 2–6% through an annular die to form a collagen tube, immersing the tube in a coagulating bath, tanning the collagen tube, and washing, plasticizing, and drying the tube to produce a translucent nonfibrous edible product.

2. A method as defined in claim 1 in which the tanning bath contains a tanning agent consisting of a soluble ferric or aluminum salt or a nontoxic dialdehyde.

References Cited

UNITED STATES PATENTS

| | | |
|---|---|---|
| 2,485,957 | 10/1949 | Cresswell. |
| 3,071,477 | 1/1963 | Klerens _____ 99—176 |
| 3,123,482 | 3/1964 | Lieberman _____ 99—176 |
| 3,194,865 | 7/1965 | Fagan et al. _____ 99—176 X |
| 3,235,641 | 2/1966 | McKnight. |

HYMAN LORD, *Primary Examiner.*

UNITED STATES PATENT OFFICE
CERTIFICATE OF CORRECTION

Patent No. 3,425,846                    Dated Feb. 4, 1969

Inventor(s)      Robert D. Talty

It is certified that error appears in the above-identified patent and that said Letters Patent are hereby corrected as shown below:

Column 5, line 23, "above" should read -- about --.
Column 9, line 15, "gripping" should read -- grinding --.

Signed and sealed this 18th day of April 1972.

(SEAL)
Attest:

EDWARD M. FLETCHER, JR.                 ROBERT GOTTSCHALK
Attesting Officer                       Commissioner of Patents